US006929272B2

(12) United States Patent
Matsumoto et al.

(10) Patent No.: US 6,929,272 B2
(45) Date of Patent: Aug. 16, 2005

(54) SUSPENSION SUPPORT STRUCTURE

(75) Inventors: Mitsutaka Matsumoto, Kanagawa (JP); Susumu Kawahata, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 232 days.

(21) Appl. No.: 10/320,424

(22) Filed: Dec. 17, 2002

(65) Prior Publication Data

US 2003/0122337 A1 Jul. 3, 2003

(30) Foreign Application Priority Data

Dec. 25, 2001 (JP) ........................................ 2001-392338

(51) Int. Cl.[7] .............................................. B62D 21/11
(52) U.S. Cl. .............................................. 280/124.109
(58) Field of Search ........................ 280/124.109, 785, 280/791, 795, 800

(56) References Cited

U.S. PATENT DOCUMENTS 6,511,096 B1 * 1/2003 Kunert et al. ............... 280/785

FOREIGN PATENT DOCUMENTS

| DE | 101 09 636 A1 | 9/2002 |
| GB | 2 295 127 A | 5/1996 |
| WO | WO 96/32312 A1 | 10/1996 |

* cited by examiner

Primary Examiner—Faye M. Fleming
(74) Attorney, Agent, or Firm—Sughrue Mion, PLLC

(57) ABSTRACT

A suspension support structure has left and right suspension arms which are joined to and supported by a first cross member disposed so as to extend along the vehicle width direction and a second cross member disposed so as to extend along the vehicle width direction in the rear of the first cross member. The first cross member has a first intermediate part, and two first end parts which extend forward at an inclination to the vehicle body from the both ends of the first intermediate part and are supported at the vehicle body side. The second cross member has a second intermediate part, and two second end parts which extend rearward at an inclination to the vehicle body from the both ends of the second intermediate part and are supported at the vehicle body side.

4 Claims, 8 Drawing Sheets

PRIOR ART

SUSPENSION SUPPORT STRUCTURE

BACKGROUND OF THE INVENTION

1. Field of the Invention

The present invention relates to a suspension support structure that joins and supports left and right suspension arms by cross members.

2. Description of the Related Art

In a conventional suspension support structure, as shown in FIG. 9 of the accompanying drawings, suspension arms 103 are joined to and supported by first and second cross members 101, 102 disposed so as to be substantially parallel to the vehicle width direction, both ends of each of the cross members 101, 102 being fixed to a side frame (not shown in the drawing). The first and second cross members 101, 102 are linked by two struts 104, 105, which are disposed so as to be substantially parallel to the front and back direction of the vehicle, thereby forming, with the first and second cross members 101, 102, a substantially rectangular overall shape. In the case in which a vehicle having the suspension support structure shown in FIG. 9 is braked when traveling in a left direction in FIG. 9, if the right driven wheel (not shown in the drawing) rides up on sand or ice so that it spins, tire 106 receives a rearward-directed force 107 from the road surface, and forces 108, 109 act in opposite directions along the vehicle width direction at the linking part between the first and second cross members 101, 102 and the suspension arms 103. There is a danger that these external forces 108, 109 will cause a deformation in the rectangular structure formed by the first and second cross members 101, 102 and the struts 104, 105, such as shown by the double-dot-dashed line in the drawing. For this reason, there arises the need to provide some partial reinforcement at the joining parts 110, 111, 112, and 113 between the first and second cross members 101, 102 and the struts 104, 105, so as to establish rigidity in the rectangular structure to suppress this deformation. Although such reinforcement can be eliminated by making the first and second cross members and struts as one piece, if this is done there is an inherent reduction in the dimensional accuracy because of the increase in the size of the structure. For this reason, there is a danger that there is an increase in the chance of a relative position offset between the cross members and the side frame when these elements are assembled, leading to complicating assembly.

SUMMARY OF THE INVENTION

Accordingly, considering the above-noted situation, it is an object of the present invention to provide a low-cost, lightweight suspension support structure that establishes rigidity, without requiring partial reinforcement, and with quality assembly.

In order to achieve the above-noted object, in as suspension support structure according to the present invention the left and right suspension arms are joined to and supported by a first cross member, which is disposed along the vehicle width direction, and a second cross member, which is disposed along the vehicle width direction in the rear of the first cross member. The first cross member has a first intermediate part, and two first end parts which extend from two ends of the first intermediate part toward the front of the vehicle at an inclination and are supported at the vehicle body. The second cross member has a second intermediate part which is joined to the first intermediate member, and two second end parts which extend from two ends of the second intermediate part toward the rear of the vehicle at an inclination and are supported at the vehicle body.

In the above-noted suspension support structure, the first intermediate part of the first cross member and the second intermediate part of the second cross member are joined, the two first end parts, left and right, from the ends of the first intermediate part at an inclination toward the front at are each supported at the vehicle body, and the two second end parts, left and right, from the ends of the second intermediate part at an inclination toward the rear at each supported at the vehicle body. The first cross member and second cross member, which join and support the suspension arms, therefore, form a substantially overall X-shape.

For example, in the case in which the vehicle transitions from a running condition to the braked condition, because if one of the driven wheels rides up on sand or ice so that it spins, the tire of the other driven wheel receives a rearward-directed force, forces acting in opposite directions along the vehicle width direction act upon the first cross member and the second cross member.

In contrast to the above, in the suspension support structure of the present invention because the first cross member and the second cross member form an substantially overall X-shape, even in forces in opposite directions act upon the first and second cross members, these are appropriately supported by the first end parts, left and right, which extend obliquely forward and the second end parts, left and right, which extend obliquely rearward. It is therefore possible without requiring partial reinforcement, to rigidly support the forces acting upon the first and second cross members.

The suspension support structure of the present invention is configured so that the first cross member and the second cross member are joined at both the first and second intermediate parts or, stated differently, it is configured so that the substantially overall X-shape is divided into two members. For this reason, compared to the case in which the overall structure is configured from a single member, each member is reduced in size, thereby making it possible to achieve the required dimension accuracy when manufacturing. It is therefore difficult for relative positional offset to occur when the first and second cross members are assembled to the vehicle body, thereby achieving quality assembly.

Additionally, because partial reinforcement is not required, it is possible to reduce cost and reduce the weight of the structure.

In the above-noted suspension support structure, the first intermediate part of the first cross member and the second intermediate part of the second cross member may be disposed in mutual opposition with a space therebetween and joined by a joining member.

In this configuration, although the first and second intermediate parts extending in the vehicle width direction, and the first and second end parts extending at an inclination, are bent or curved and connected, it is possible to reduce the bending angle of the connection part to the extent that the two intermediate parts are separated. For this reason, it is possible to reduce the individual loss of strength in the first cross member or second cross member (material) caused by the extension in a bent or curved manner, thereby further improving the overall rigidity of the structure.

It is alternatively possible to have a configuration in which the joining member can freely change the distance between the first intermediate part and the second intermediate part. Specifically, for example, it is possible to have the joining member held by bolts to the first intermediate part and the second intermediate part, and to provide bolt holes elongated in the front and back direction of the vehicle in joining member.

In this configuration, even if a dimensional error occurs in the first and second cross members at the time of fabrication, it is possible for this error to be absorbed by changing the distance between the first and second intermediate parts. There is therefore an improvement in the quality of the assembly of the first and second cross members into the car body.

Additionally, it is possible to fix a rack bracket supporting a steering rack unit for transmitting steering wheel operations to the left and right wheels at either one or more locations of the first end parts of the first intermediate part or the second end parts of the second intermediate part.

In this configuration, it is possible by the rack bracket to reduce individual loss of strength in the first cross member or second cross member (material) due to the first and second intermediate parts and the first and second end parts being connected in a bent or curved manner, thereby further improving the overall rigidity of the structure.

These and other objects and features of the present invention are made obvious by the illustrative embodiments described below in connection with the accompanying drawings, or are indicated in the attached claims. Additionally, other various advantages not referred to explicitly herein will occur to persons skilled in the art upon employing the invention in practice.

DETAILED DESCRIPTION OF THE PREFERRED EMBODIMENTS

Figure 1:
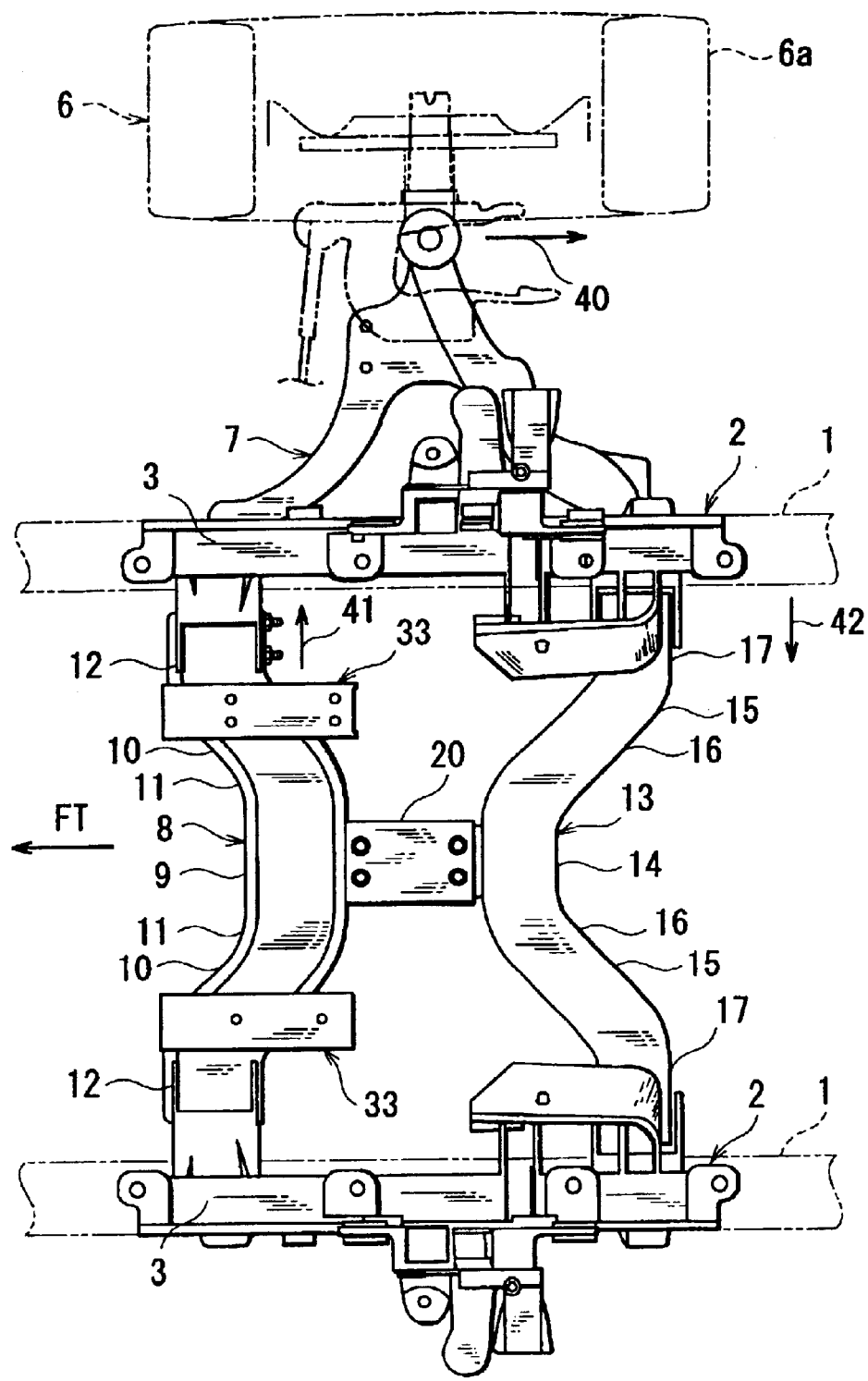
FIG. 1 is a plan view of a suspension support structure according to a first embodiment of the present invention.

Various embodiments of the present invention are described below with reference to accompanying drawings. It is to be noted that the same or similar reference numerals are applied to the same or similar parts and elements throughout the drawings, and that descriptions of same or similar parts already described will be omitted or simplified.

In the descriptions below, the term front and back direction refers to the front and back direction of the vehicle, and the term left and right direction refers to the left and right direction in the view facing toward the front of the vehicle from therewithin. The arrow Ft in the accompanying drawings indicates the front direction of the vehicle.

As shown in FIG. 1, at the bottom part of the body of a vehicle having a chassis frame, a pair of side members 1, left and right, are provided as the chassis frame so as to extend along the front and back direction of the vehicle at the left and right sides in the vehicle width direction. Each side member 1 has a substantially U-shaped cross-section opening toward to the inside in the vehicle width direction.

Figure 2:
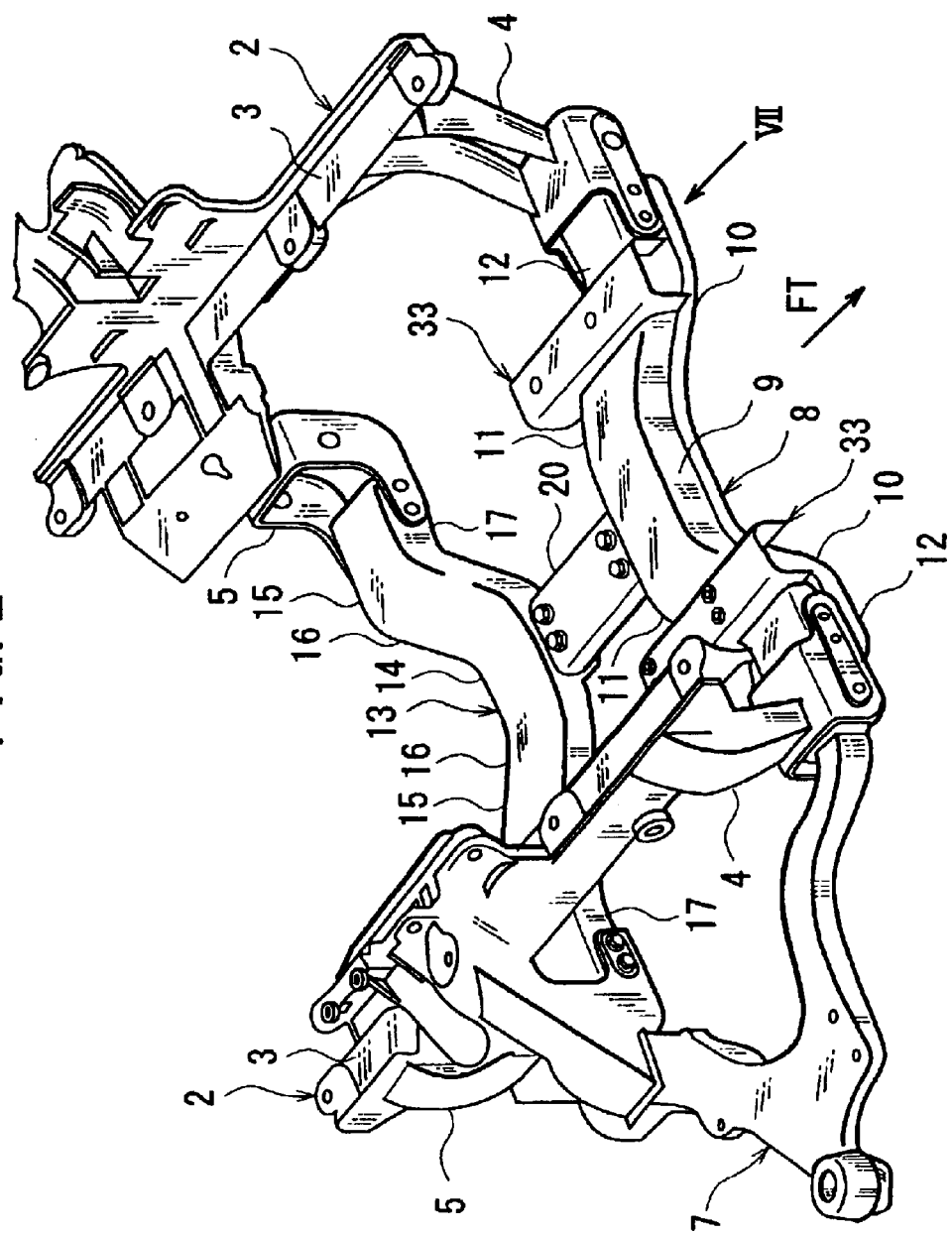
FIG. 2 is an oblique view of the embodiment shown in FIG. 1.

Brackets 2 are fixed to each of the left and right side members 1. Each bracket 2 has a mounting plate 3 connected to the bottom wall under surface of the each side member 1, and as shown in FIG. 2, a front leg part 4 extending downward from the front part of each mounting plate 3, and a rear leg part 5 extending downward from the rear part of the each mounting plate 3.

Left and right suspension arms 7 (only the one on the right side in the vehicle advancing direction being shown in FIG. 1) extending farther outside than the side members 1 in the vehicle width direction and supporting the front wheels 6 (only the one on the right side in the vehicle advancing direction being shown in FIG. 1) are tightened and fixed onto the front leg part 4 and the rear leg part 5 of each bracket 2. The left and right suspension arms 7 are substantially V-shaped, the two end parts of each being tightened and fixed respectively to each of the front and rear leg parts 4 and 5, and the portions extending outward in the vehicle width direction from the two end parts and crossing being joined to the front wheels 6.

Between the front leg parts 4 of the left and right brackets 2, a first cross member 8 having a cross-section that is substantially U-shaped opening downward, is provided along the vehicle width direction. The first cross member 8 has a first intermediate part 9, which is disposed along the vehicle width direction, and two first end parts 10, which extend from two ends of the first intermediate part 9. Each of the first end parts 10 has an extension part 11, which extends from the first intermediate part 9, bending in a curve forward at inclination to the vehicle, and an end 12, which extends from the extension part 11, bending in a curve toward the outside along the vehicle width direction. The left and right ends 12 are tightened and fixed to the front leg parts 4 of the left and right brackets 2, respectively.

Between the rear leg parts 5 of the left and right brackets 2, a second cross member 13 having a cross-section that is substantially U-shaped opening downward, is provided along the vehicle width direction in the rear of the first cross member 8. The second cross member 13 has a second intermediate part 14, which is disposed along the vehicle width direction at a distance from the first intermediate part 9 in the rear of it, and two end parts 15, which extend from the two ends of the second intermediate part 14. Each of the second end parts 15 has an extension part 16, which extends from the second intermediate part 14, bending in a curve rearward at an inclination to the vehicle, and an end 17, which extends from the extension part 16, bending in a curve toward the outside along the vehicle width direction. The left and right ends 17 are tightened and fixed to the rear leg parts 5 of the left and right brackets 2, respectively.

The tightening structure between the bracket 2 and the first and second cross members 8, 13 is described below in further detail, with reference to FIG. 3.

Figure 3:
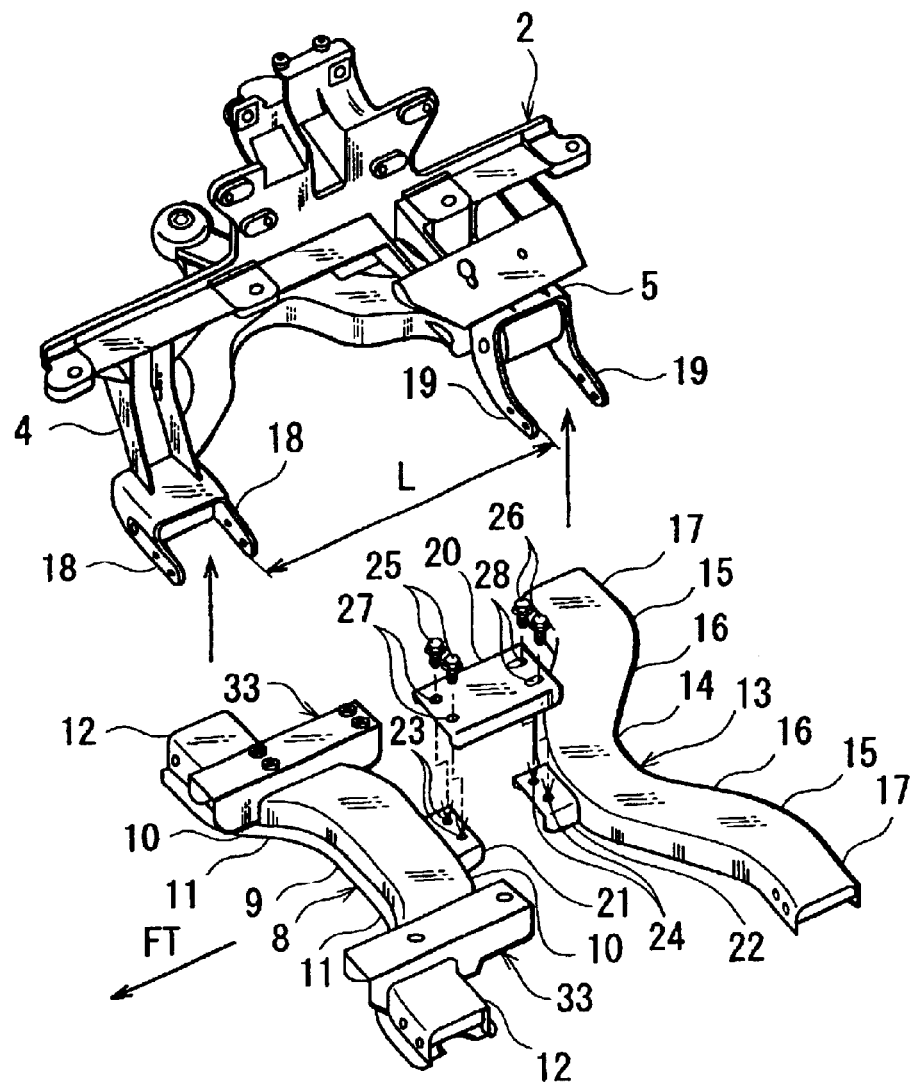
FIG. 3 is an exploded oblique view of the embodiment shown in FIG. 1.

As shown in FIG. 3, on the lower inner end parts of the front leg part 4 and the rear leg part 5 of the bracket 2 is fixed a pair of mutually opposing cross member mounting plates 18, 19, respectively, extending inward in the vehicle width direction. The ends 12, 17 of the first and second cross members 8, 13 are inserted between the mounting plates 18, 19, respectively, and tightened to the mounting plates 18, 19 by bolts and nuts (not shown in the drawing).

The first and second cross members 8, 13 are thus supported by the side members 1 of the vehicle body via the brackets 2, and join and support the left and right suspension arms 7.

The first intermediate part 9 of the first cross member 8 and the second intermediate part 14 of the second cross member 13, which are disposed opposite to each other at a distance are joined by a joining member 20. Specifically, as shown in FIG. 3, a first flange part 21, which protrudes from the rear end of the first intermediate part 9 rearward to the second intermediate part 14, is formed on the first intermediate part 9, and a second flange part 22, which protrudes from the front end of the second intermediate part 14 forward to the first intermediate part 9, is formed on the second intermediate part 14. The joining member 20 is disposed on the first and second flange parts 21, 22 so as to span across the flange parts 21, 22. Bolt holes 23, 24 are provided in the flange parts 21, 22, respectively, and two each of bolt insertion holes 27, 28 are provided at the front and back in the joining member 20. Bolts 25, 26, which are inserted through the bolt insertion holes 27, 28, are screwed into the bolt holes 23, 24, thereby tightening and fastening the joining member 20 to the first and second cross members 8, 13.

Figure 4:
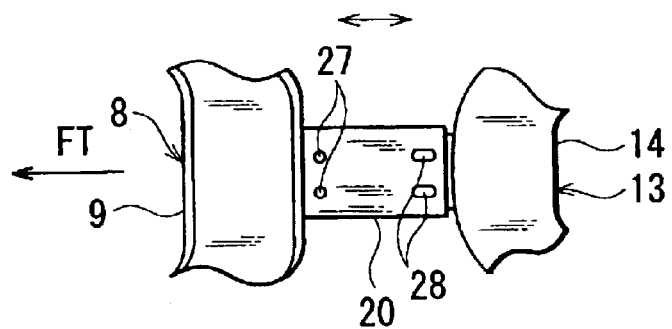
FIG. 4 is a partial magnified view of the embodiment shown in FIG. 1.

As shown in FIG. 4, the two bolt insertion holes 28 at the rear side of the vehicle are elongated in the front and back direction of the vehicle. By these elongated holes, it is possible to vary and adjust the distance between the end 12 of the first cross member 8 and the end 17 of the second cross member 13 in accordance with the priorly established distance L (shown in FIG. 3) between the mounting plate 18 at the rear of the front leg part 4 and the mounting plate 19 at the front of the rear leg part 5. It should be noted that the bolts 25, 26 are not shown in FIG. 4.

Figure 5:
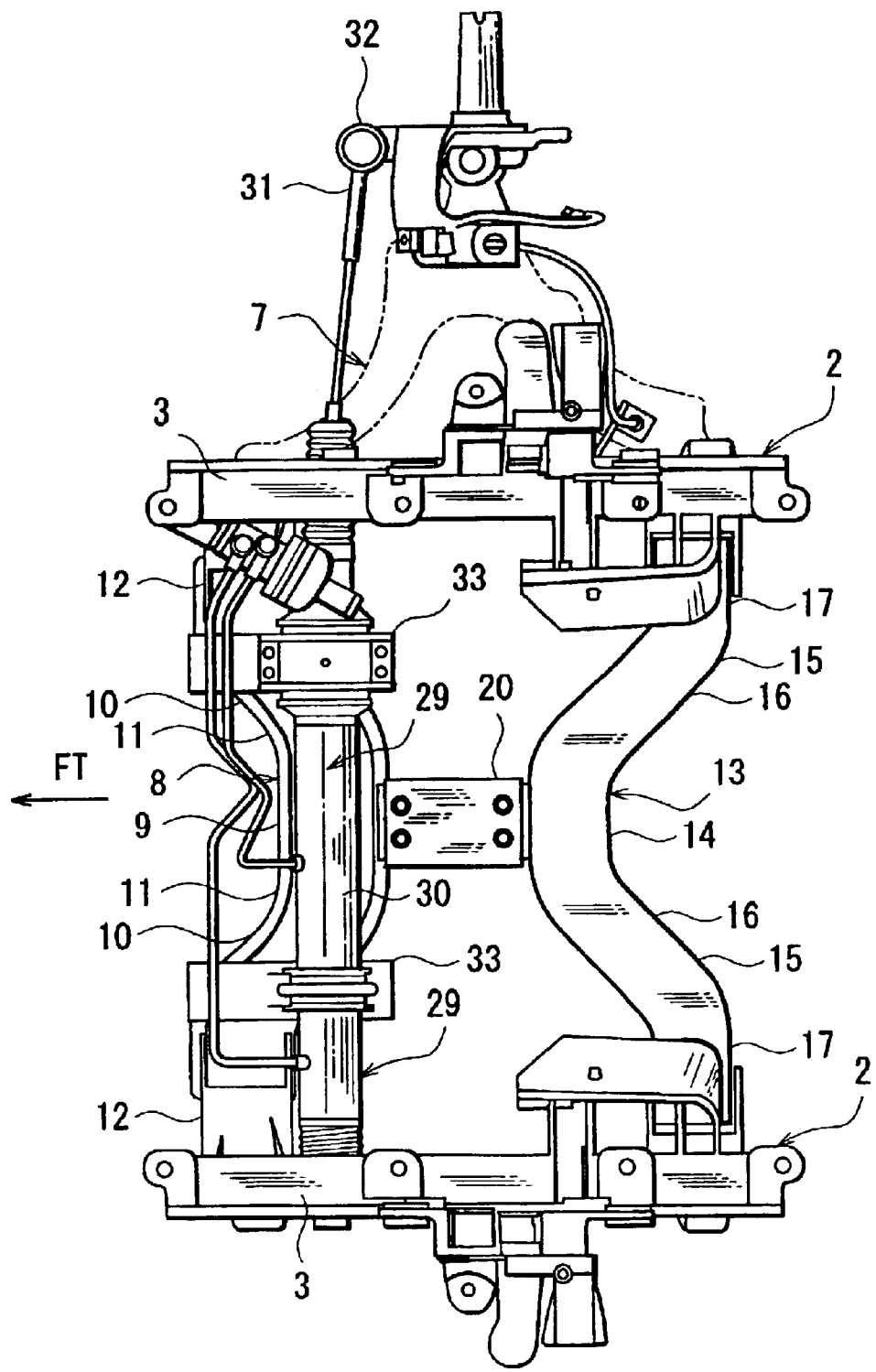
FIG. 5 is a plan view showing the condition of a steering rack unit supported by the first cross member of the embodiment shown in FIG. 1.
Figure 6:
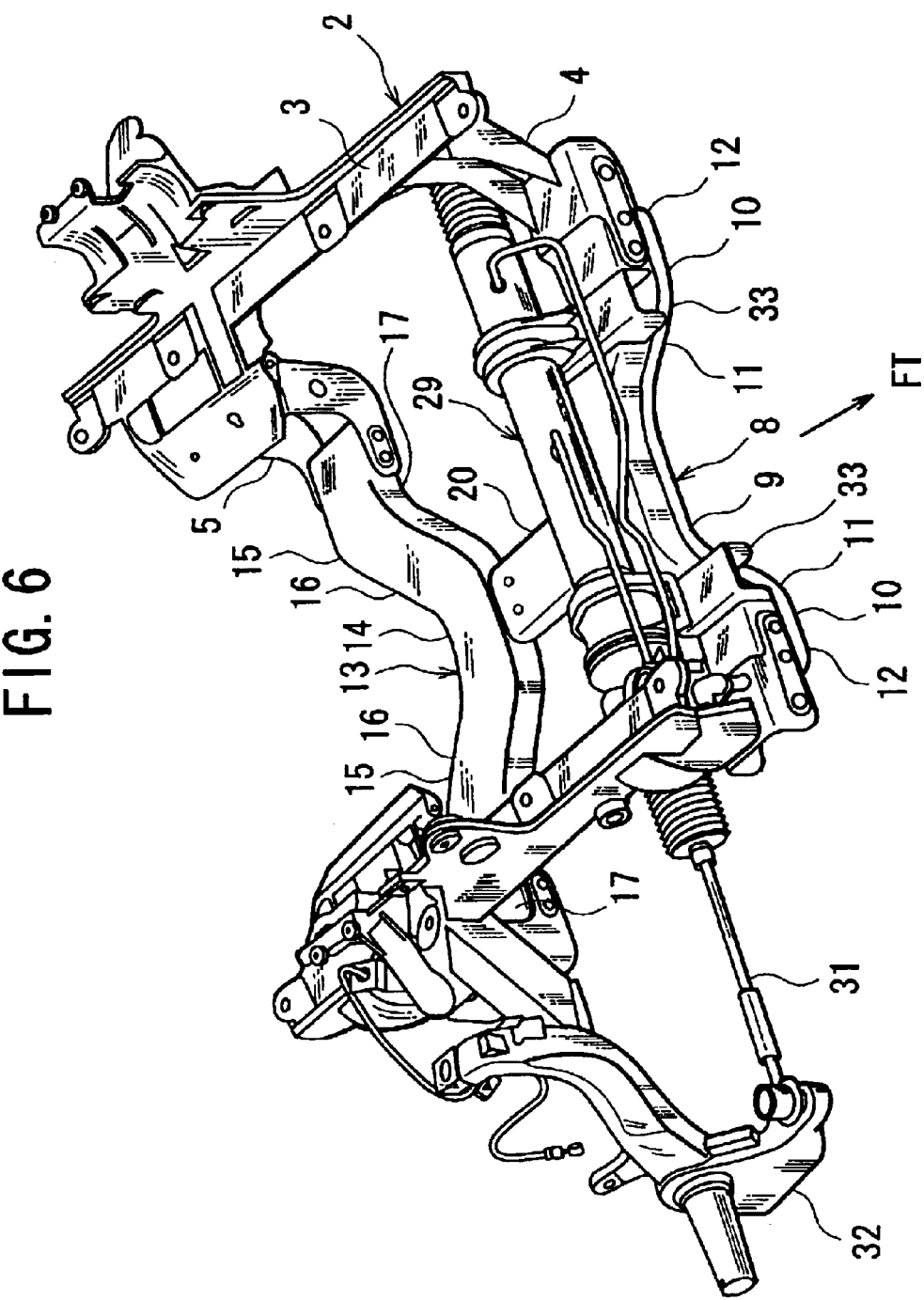
FIG. 6 is an oblique view of the condition shown in FIG. 5.

As shown in FIG. 5 and FIG. 6, a steering rack unit 29 for transmitting steering wheel operations to the left and right wheels 6 (only the right of which is shown in FIG. 1) is disposed above the first cross member 8. The steering rack unit 29 has a steering rack (not shown in the drawing), which meshes with a pinion gear (not shown in the drawing) on the end of a steering shaft (not shown in the drawing), and a rack tube 30, which covers the steering rack. Tie rods 31 which extend from both ends of the steering rack are joined to left and right knuckle arms 32 (only the right of which are shown in FIG. 5 and FIG. 6). It should be noted that the suspension arm 7 is not shown in FIG. 6.

Figure 7:
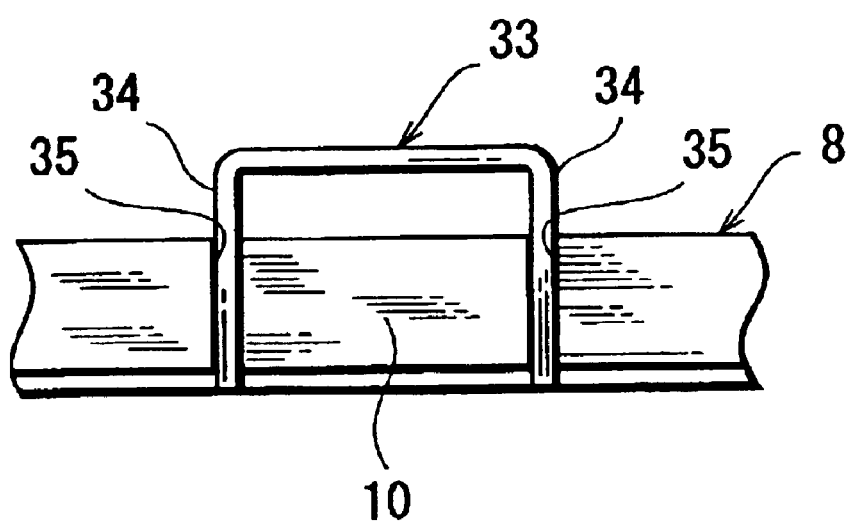
FIG. 7 is a partial magnified view of the first cross member and the rack bracket of FIG. 2, seen in the direction of the arrow VII.

Rack brackets 33 are fixed to the extension parts 11 of the left and right end parts 10 of the first cross member 8, and the rack tube 30 is placed on, joined and fixed to the rack brackets 33. As shown in FIG. 2, the rack bracket 33 has a cross-section that is substantially U-shaped opening downward, and is disposed along the front and back direction of the vehicle so as to intersect with the first end part 10. As shown in FIG. 7, two grooves 35 into which are inserted the opposing walls 34 of the rack bracket 33, are formed in each end part 10. By the opposing walls 34 being inserted and welded into the grooves 35, the rack bracket 33 is fixed to the first end part 10.

The operation of this embodiment of the present invention is described below.

When the tire 6a of the front wheel 6 receives an inward-directed or outward-directed force in the vehicle width direction while the vehicle is running, this external force acts on the first and second cross members 8, 13 via the suspension arms 7. When this occurs, because the forces acting on the first and second cross members 8, 13 are in the same direction, these forces are reliably dispersed and supported by the side member 1 and the first and second cross members 8, 13.

In the case, for example, in which the vehicle is braked from the running condition, if the front left wheel (one of the left and right driven wheels, not shown in the drawing) rides up onto sand or ice so that it spins, the tire 6a of the front right wheel (the other of the left and right driven wheels) receives a rearward-directed force, such as shown by the arrow 40 in FIG. 1. This external force acts on the first and second cross members 8, 13 via the suspension arms 7. When this occurs, the forces acting on the first and second cross members 8, 13 are directed in mutually opposite directions (the directions indicated by the arrows 41 and 42 in FIG. 1).

In contrast to the above, in the present invention as shown in FIG. 1 the first intermediate part 9 of the first cross member 8 and the second intermediate part 14 of the second cross member 13 are joined via the joining members 20, the two left and right first end parts 10 extend from the two ends of the first intermediate part 9 toward the front at an inclination to the vehicle body and are each supported by the vehicle body, and the two left and right second end parts 15 extend from the two ends of the second intermediate part 14 toward the rear at an inclination to the vehicle body and are each supported by the vehicle body. That is, the first cross member 8 and the second cross member 13 joining and supporting the left and right suspension arms 7 have an overall form that is substantially X-shaped via the joining members 20.

Therefore, even if mutually opposing forces 41, 42 act upon the first and second cross members 8, 13, the left and right first end parts 10 extending forward at an inclination and the left and right second end parts 15 extending rearward at an inclination support these forces properly. It is therefore possible to firmly support the forces acting on the first and second crossmembers 8, 13 without the need for partial reinforcement, thereby enabling simplification of the structure and a reduction in cost and weight of the structure.

Not only when the vehicle is braked but also when the vehicle is in the running condition, if the front left wheel (not shown in the drawing) rides up onto sand or ice, the tire 6a on the front right wheel 6 will receive a forward-directed force from the road surface (direction opposite to that shown by the arrow 40 of FIG. 1), and forces in mutually opposing directions (directions opposite to those indicated, respectively by arrows 41 and 42 in FIG. 1) will act on the first and second cross members 8, 13. In this case as well, there is firm support of the forces acting on the first and second cross members 8, 13.

The support structure according to this embodiment of the present invention has a configuration in which the first cross member 8 and the second cross member 13 are joined via the joining members 20 at both intermediate parts (the first and second intermediate parts 9 and 14) or, stated differently, the configuration is such that the overall structure, which is substantially X-shaped, is divided into two members, these being the first cross member 8 and the second cross member 13. For this reason, compared to the case in which the overall structure is configured from a single member, there is a reduction in size of each member, and achievement of the desired dimensional accuracy at the time of fabrication. Therefore, it is difficult for relative positional offset to occur when the first and second cross members 8, 13 are assembled to the vehicle body, thereby achieving quality assembly.

The first intermediate part 9 of the first cross member 8 and the second intermediate part 14 of the second cross member 13 are disposed in mutual opposition at a distance from each other, and are joined by the joining members 20. In this case, although the first and second intermediate parts 9, 14 which extend in the vehicle width direction, and the first and second end parts 10, 15 which extend at an inclination, are bend or curved and connected, it is possible to reduce the bending angle at the connection part to the extent that the first and second intermediate parts 9, 14 are mutually separated. For this reason, it is possible to suppress the deterioration in the individual strength of the first cross member 8 or second cross member 13 (materials) due to the extension with curvature at an inclination, thereby further improving the overall rigidity of the structure.

Because the bolt insertion holes 28 shown in FIG. 4 at the rear of the joining member 20 have an elongated shape, it is possible to vary and adjust the distance between the end 12 of the first cross member 8 and the end 17 of the second cross member 13 in accordance with the priorly established distance L (shown in FIG. 3) between the mounting plate 18 at the rear of the front leg part 4 and the mounting plate 19 at the front of the rear leg part 5.

That is, even if a dimensional error occurs in the first cross member 8 or the second cross member 13 at the time of fabrication, it is possible to absorb this error by a change in the distance between the first intermediate part 9 and the second intermediate part 14. There is therefore an improvement in quality of the assembly of the first and second cross members 8, 13 into the vehicle body. It will be understood that although in this embodiment the bolt insertion holes 28 of the joining members 20 are elongated, it is alternatively possible to elongate the bolt holes 23, 24 provided in the first flange part 21 or the second flange part 22 of the first intermediate part 9 or the second intermediate part 14, respectively.

Additionally, because the rack bracket 33 supporting the steering rack unit 29 for transmitting operation of the steering wheel to the left and right wheels is fixed to the extension part 11 of the first end part 10 of the first cross member 8, it is possible by the rack bracket 29 to reduce a loss of the individual strength of the first cross member 8 (material) caused by the first intermediate part 9 and the first end part 10 being bent or curved and connected, thereby providing a further improvement in the rigidity of the overall structure.

In this manner, it is possible to achieve good assembly and achieve rigidity without the need for partial reinforcement, thereby enabling achievement of a suspension support structure that is both low in cost and lightweight.

Although in this embodiment the rack bracket 33 is fixed to the extension part 11 of the first end part 10 of the first cross member 8, regardless of the position of fixing to the first cross member 8, it is possible to suppress a deterioration in strength of the first cross member 8. Therefore, the rack bracket 33 can be fixed to the first intermediate part 9 or to the end 12, but it is preferable that it be fixed to the extension part 11, which has the greatest deterioration in strength of the first cross member 8.

A second embodiment of the present invention is described below, with reference to FIG. 8.

A support structure according to this embodiment is the same as the first embodiment from which the joining members 20 have been removed. Elements that are the same as those in the first embodiment have been assigned the same reference numerals and will not be described herein.

Figure 8:
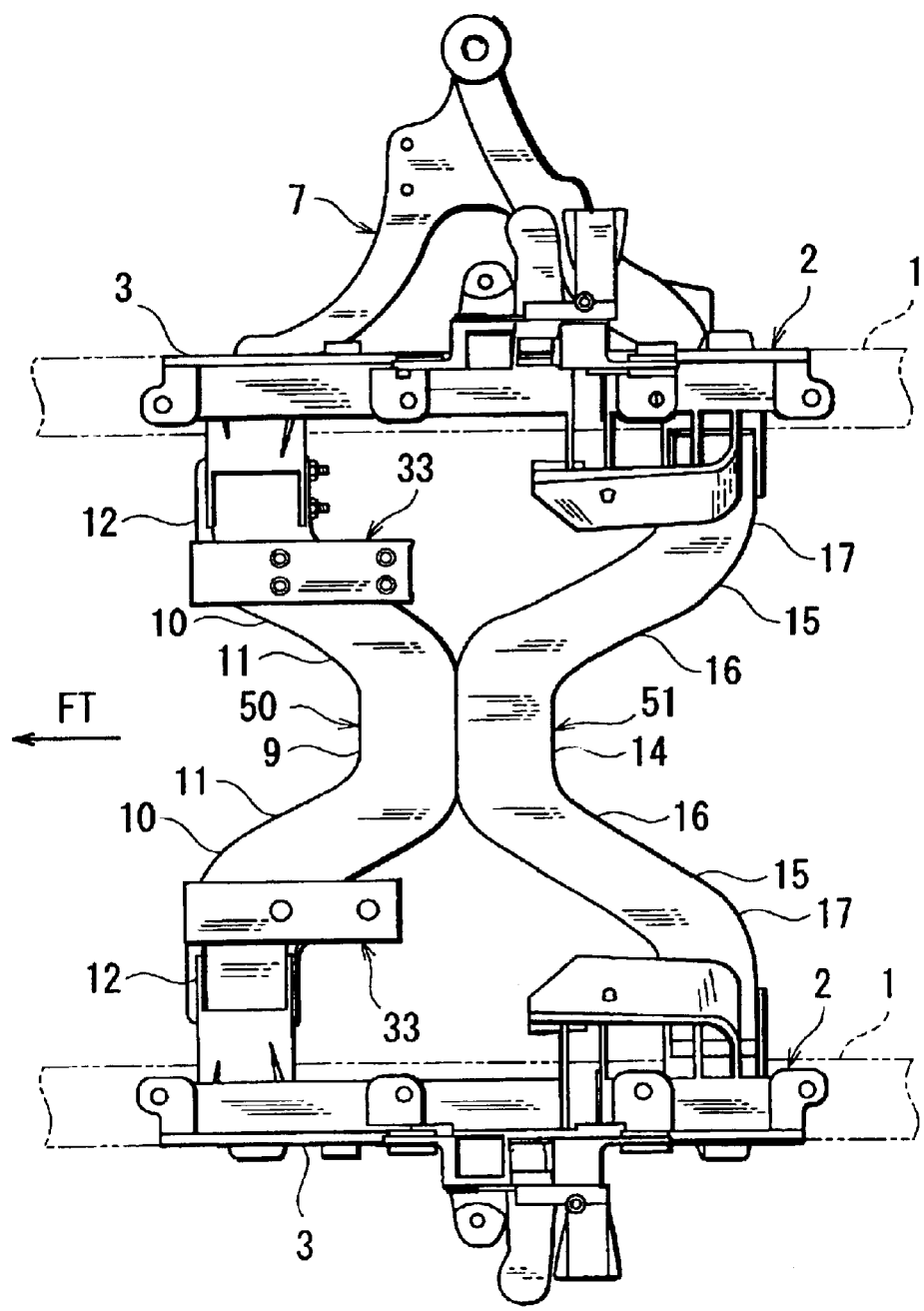
FIG. 8 is a plan view of a suspension support structure according to a second embodiment of the present invention.
Figure 9:
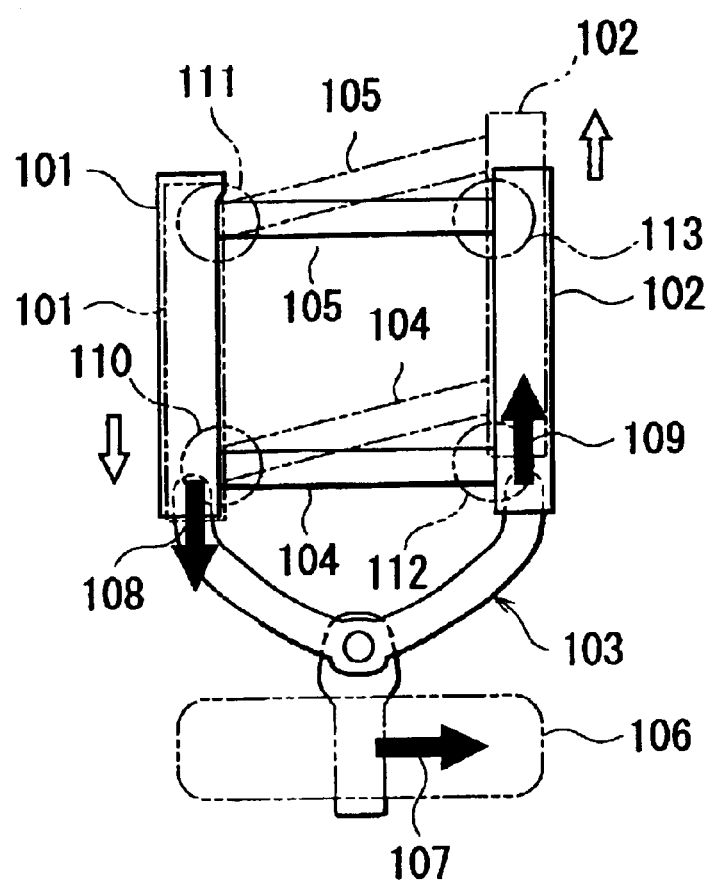
FIG. 9 is a plan view of a conventional structure.

Specifically, in this embodiment, as shown in FIG. 8, the first intermediate part 9 of the first cross member 50 and the second intermediate part 14 of the second cross member 51 are disposed so as to be adjacent at the front and rear, and the intermediate parts 9, 14 are directly bolted together by a bolts and nuts (not shown in the drawing).

According to this embodiment, in the same manner as in the first embodiment of the present invention, because the first cross member 50 and the second cross member 51 which join and support the left and right suspension arms 7 have an overall shape that is substantially X-shaped, even if forces in opposite directions act on the first and second cross members 50, 51, the left and right first end parts 10 extending forward at an inclination and the left and right second end parts 15 extending rearward at an inclination support these forces properly. It is therefore possible, without the need for partial reinforcement, to firmly support the forces acting on the first and second cross members 50, 51, thereby resulting in the simplification of the structure, reduced cost, and light weight.

Because the structure, the overall shape of which substantially an X-shape, is divided into two members (the first cross member 50 and the second cross member 51), compared to the case in which the overall structure is configured from a single member, each member is reduced in size, thereby making it possible to achieve the required dimension accuracy at the time of fabrication. It is therefore difficult for relative positional offset to occur when the first and second cross members 50 and 51 are assembled to the vehicle body, thereby achieving quality assembly.

Because the rack bracket 33 is fixed to the extension part 11 of the first end part 10 of the first cross member 50, it is possible to reduce a loss of the individual strength of the first cross member 50 (material) by the rack bracket 33, thereby providing a further improvement in the rigidity of the overall structure.

Additionally because in this embodiment of the present invention in particular the first cross member 50 and the second cross member 51 are directly joined, it is possible to reduce the number of parts and lighten and simplify the structure compared to the first embodiment, which requires a strut.

It is possible in this manner to achieve good assembly, achieve rigidity, and obtain a suspension support structure with low cost and light weight, without the need for partial reinforcement.

Although the first and second embodiments of the present invention are described in terms of a suspension support structure applied to a vehicle having a chassis frame, it will be understood that it is also possible to apply the present invention to a vehicle of monocoque body construction. It is further possible to join the first and second cross members 8, 13, 50, and 51 directly to the side members 1, without using bracket 2. It is also possible to join the suspension arms 7 directly to the first and second cross members 8, 13, not to the bracket 2. Additionally, it is possible to fix the rack bracket 33 to the second end part 15 of the second cross members 13, 51.

As described in detail above, according to the present invention it is possible without the need for partial reinforcement, to achieve a good assembly, achieve rigidity, and obtain a suspension support structure that is low-cost and lightweight.

While preferred embodiments of the present invention are described above using specific terms, such description is exemplary and will not be taken to be restrictive, and it will be understood that changes and variations may be made to the present invention within the spirit of the present invention or the scope of the present invention as recited in the accompanying claims.

What is claimed is:

1. A suspension support structure comprising:

a first cross member disposed along a vehicle width direction, the first cross member having a first intermediate part, and two first end parts which extend from two ends of the first intermediate part toward a front of the vehicle at an inclination to a vehicle body and are supported at the vehicle body;

a second cross member disposed along the vehicle width direction in a rear of the first cross member, the second cross member having a second intermediate part joined to the first intermediate part, and two second end parts which extend from two ends of the second intermediate part toward a rear of the vehicle at an inclination to the vehicle body and are supported at the vehicle body; and suspension arms disposed on both sides of the vehicle in the vehicle width direction, which are joined to and supported by the first and second cross members.

2. A suspension support structure according to claim 1, further comprising a joining member, wherein the first intermediate part of the first cross member and the second intermediate part of the second cross member are disposed in mutual opposition and with a distance therebetween, and are joined by the joining member.

3. A suspension support structure according to claim 2, wherein the joining member joins the first intermediate part and the second intermediate part so that it is possible to change the distance therebetween.

4. A suspension support structure according to claim 1, further comprising:

a rack bracket supporting a steering rack unit for transmitting operation of a steering wheel to left and right wheels, the rack bracket being fixed to at least one location in the first cross member or the second cross member.

* * * * *